March 5, 1935. R. E. BOHRER ET AL Re. 19,484

CHECK WRITER

Original Filed Feb. 14, 1928 6 Sheets-Sheet 1

INVENTORS
RAYMOND E. BOHRER
WALTER B. PAYNE
ELLA M. TIEFEL,
Executrix of CHARLES G. TIEFEL, Dec'd.
BY Cumpston & Griffith.
Attorneys.

March 5, 1935. R. E. BOHRER ET AL Re. 19,484

CHECK WRITER

Original Filed Feb. 14, 1928 6 Sheets-Sheet 2

INVENTORS
RAYMOND E. BOHRER
WALTER B. PAYNE
ELLA M. TIEFEL,
Executrix of CHARLES G. TIEFEL, Dec'd.
BY Crumpton + Griffith.
ATTORNEYS.

March 5, 1935. R. E. BOHRER ET AL Re. 19,484

CHECK WRITER

Original Filed Feb. 14, 1928 6 Sheets-Sheet 3

INVENTORS
RAYMOND E. BOHRER
WALTER B. PAYNE
ELLA M. TIEFEL,
Executrix of CHARLES G. TIEFEL, DEC'D
BY Crumpton + Griffith.
ATTORNEYS.

March 5, 1935. R. E. BOHRER ET AL Re. 19,484

CHECK WRITER

Original Filed Feb. 14, 1928 6 Sheets-Sheet 4

INVENTORS
RAYMOND E. BOHRER
WALTER B. PAYNE
ELLA M. TIEFEL.
Executrix of CHARLES G. TIEFEL, Dec'd
BY
Crumpston + Griffith.
ATTORNEYS.

March 5, 1935. R. E. BOHRER ET AL Re. 19,484

CHECK WRITER

Original Filed Feb. 14, 1928 6 Sheets-Sheet 5

INVENTORS
RAYMOND E. BOHRER
WALTER B. PAYNE
ELLA M. TIEFEL,
Executrix of CHARLES G. TIEFEL, dec'd
BY
Cumpston & Griffith.
ATTORNEYS.

March 5, 1935. R. E. BOHRER ET AL Re. 19,484

CHECK WRITER

Original Filed Feb. 14, 1928 6 Sheets-Sheet 6

INVENTORS
RAYMOND E. BOHRER
WALTER B. PAYNE
ELLA M. TIEFEL,
Executrix of CHARLES G. TIEFEL, Dec'd
BY
Crumpston + Griffith.
ATTORNEYS.

Reissued Mar. 5, 1935 Re. 19,484

UNITED STATES PATENT OFFICE 19,484

CHECK WRITER

Raymond E. Bohrer and Walter B. Payne, Rochester, N. Y., and Charles G. Tiefel, deceased, late of Rochester, N. Y., by Ella M. Tiefel, executrix, Rochester, N. Y., assignors to The Todd Company, Incorporated, Rochester, N. Y., a corporation of New York Original No. 1,787,234, dated December 30, 1930, Serial No. 254,313, February 14, 1928. Application for reissue July 26, 1934, Serial No. 737,124

32 Claims. (Cl. 101—20)

This invention relates to check writers and analogous machines, and has for its principal object the provision of a generally improved mechanism and one which is easier to construct and more satisfactory to operate than those heretofore known.

Another object of the invention is to provide a machine with improved mechanism for moving the printing instrumentalities toward and away from the platen to print the desired characters.

A further object of the invention is to provide improved mechanism for setting up the printing instrumentalities to determine what character or characters shall be printed. Preferably such setting-up mechanism is arranged so that it remains operatively connected to the printing instrumentalities throughout their movement toward and away from the platen, while at the same time the setting-up mechanism does not participate in such movement.

An additional object of the invention is the provision of an adjustable paper guide for cooperation with the sheet of paper to be printed upon, which paper guide is movable to an ineffective position in which it will not interfere with movement of the sheet of paper.

It is still another object of the invention to provide a prefix character movable to different printing positions and also conveniently removable from the machine so that it may be replaced by another prefix character having a different wording or symbol thereon. A still further object is the provision of improved means, preferably including a cam, for moving the prefix character from one printing position to another.

Still an additional object of the invention is the provision of a novel form of connecting mechanism for joining the part of the machine carrying the platen to the part of the machine on which the printing instrumentalities are mounted, such mechanism being designed to allow comparatively large sheets of paper to be inserted between the platen and the printing instrumentalities.

To these and other ends the invention resides in certain improvements and combinations of parts, all as will be hereinafter more fully described, the novel features being pointed out in the claims at the end of the specification.

In the drawings.

The same reference numerals refer to the same parts throughout the several views.

Figure 3:
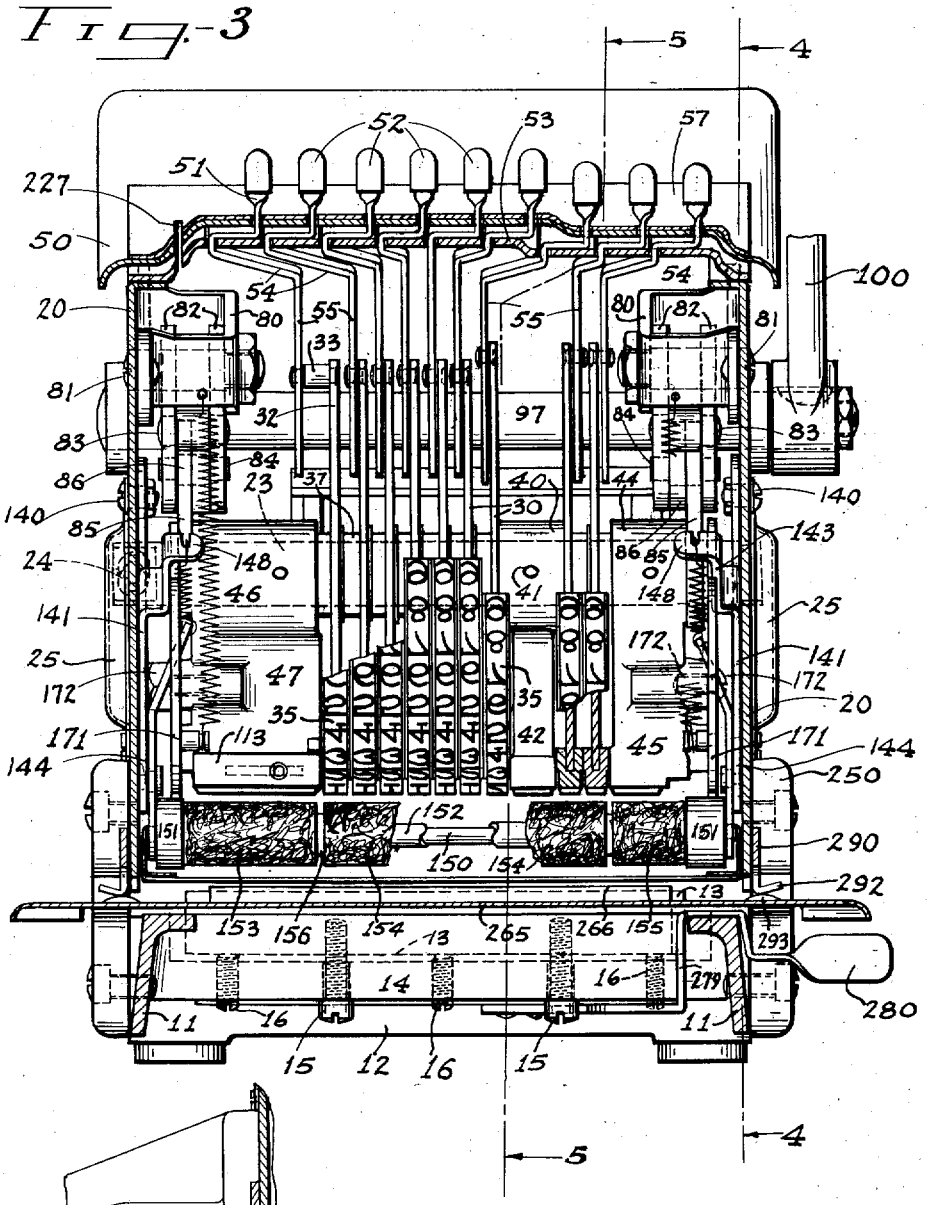
Fig. 3 is a transverse vertical section taken approximately on the line 3—3 of Fig. 4.

Referring now to the drawings, there is illustrated a machine comprising a base having side walls 11 and end walls 12, this base being provided with feet adapted to rest on any suitable supporting surface such as a table or desk. A platen 13 may be adjustably mounted on a cross-rail 14 formed integrally with the side members 11 of the base, this platen being adjusted by means of the draw screws 15 and adjusting screws 16, as best shown in Fig. 3. It will be understood that the platen preferably has its upper surface roughened in the manner known in the art, this roughened surface being adapted to cooperate with roughened type faces on printing instrumentalities to be described later, so that an embossing or shredding action on the paper takes place when the type faces are brought down against a sheet of paper laid on the platen.

Above the base, and supported from it by suitable brackets to be described later, there is mounted a casing including side walls 20 and end walls 21. In the side walls 20 slots 22 are formed, these slots serving as guideways for a shaft 23 which extends across the machine between the two side walls 20. This shaft has flattened ends which project through the slots 22 and have a snug sliding fit therein, so that rotation of the shaft is prevented, although it may move bodily in a transverse direction, the flattened ends sliding in the slots 22 during such movement.

Figure 2:
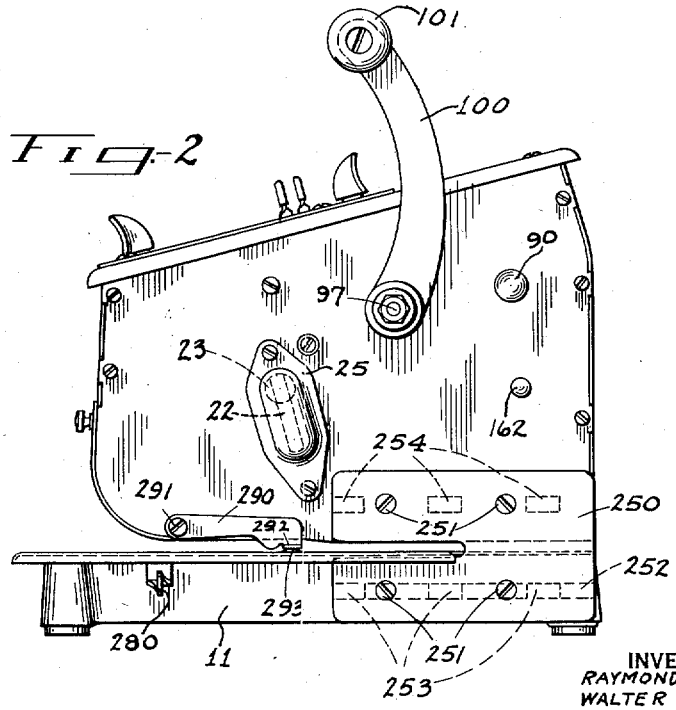
Fig. 2 is a side elevation thereof.
Figure 6:
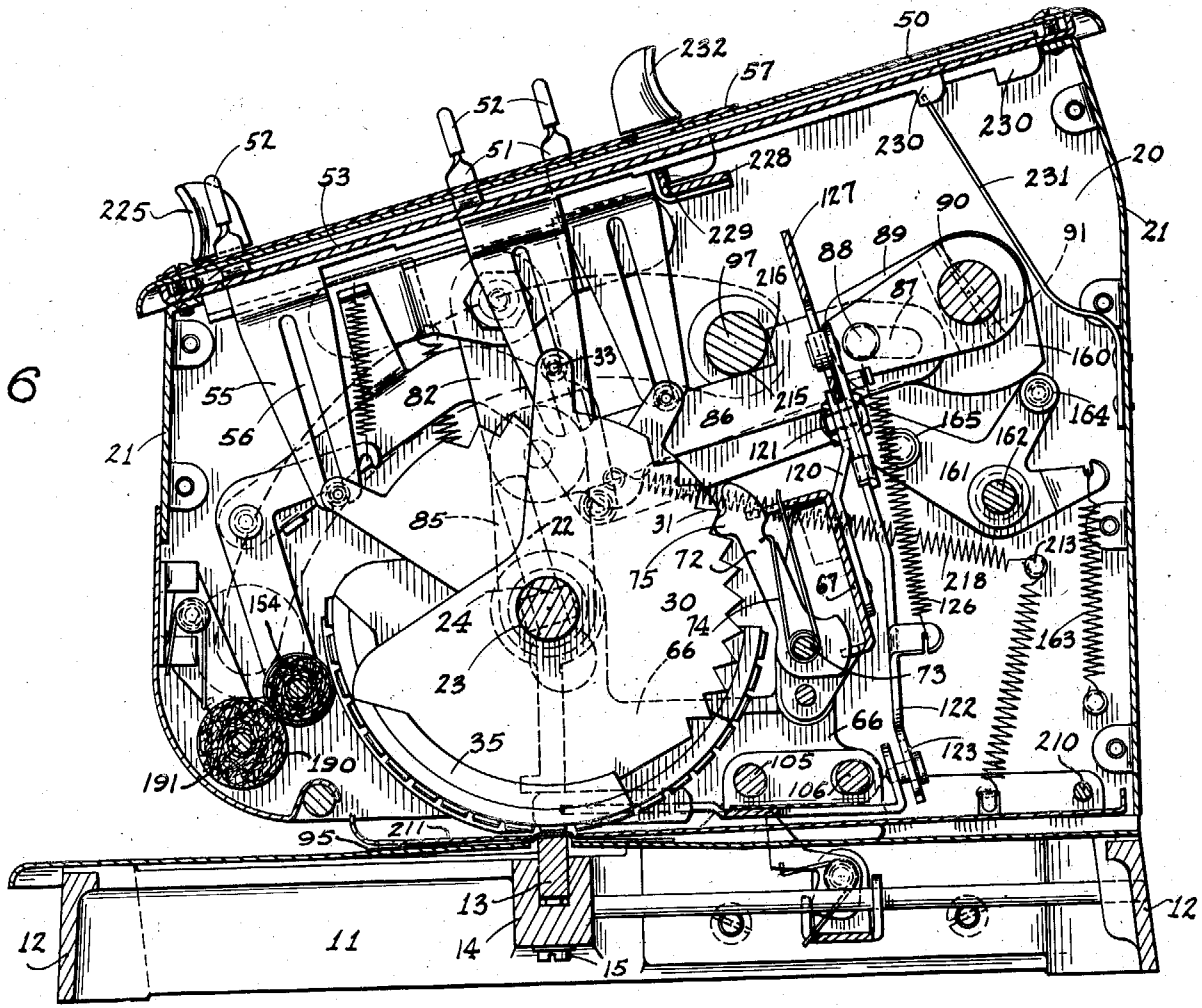
Fig. 6 is a longitudinal vertical section similar to Fig. 5, showing the parts in position for printing.
Figure 7:
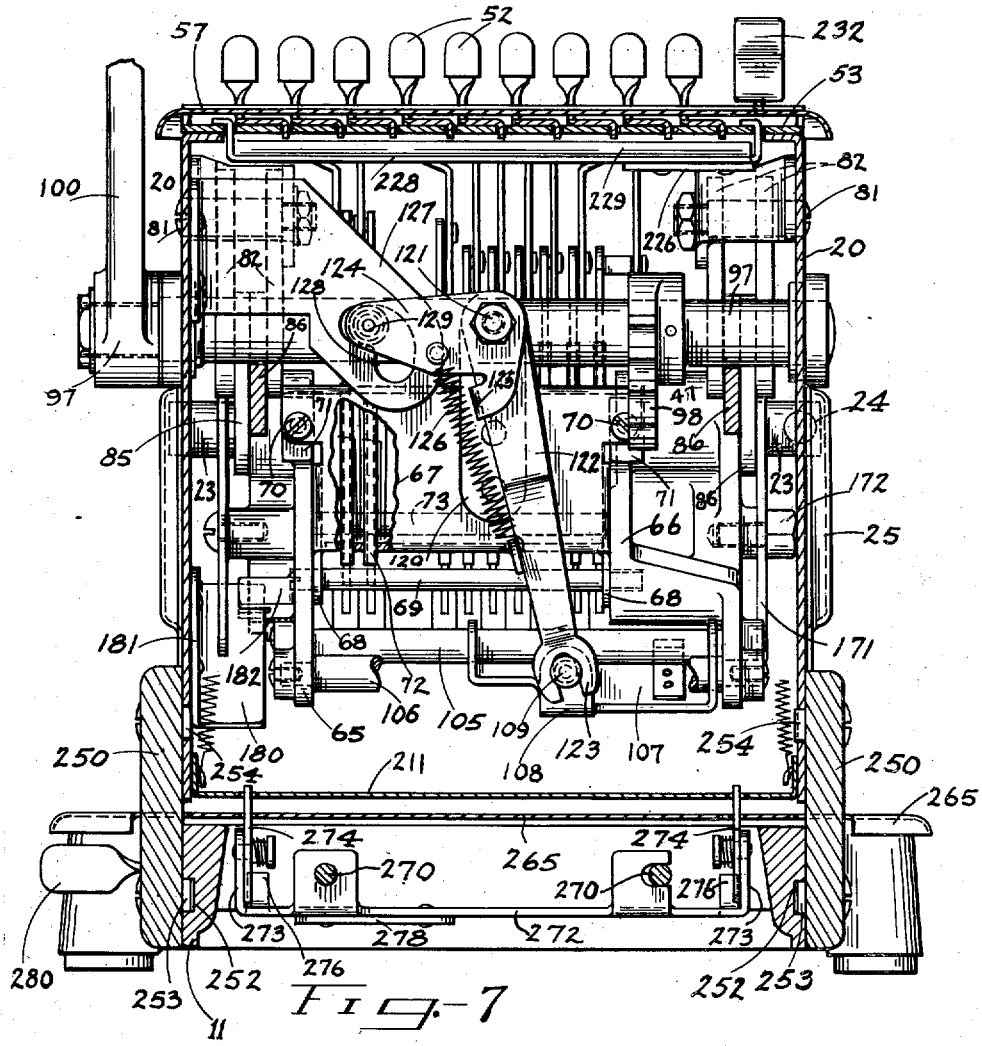
Fig. 7 is a transverse vertical section taken approximately on the line 7—7 of Fig. 4, looking from the rear toward the front of the machine.

For retaining the shaft in proper position and preventing longitudinal movement thereof, a pin 24 is inserted through a hole in the shaft, in the plane of one of the side walls 20 and approximately perpendicular to the direction of the guide slots 22. This pin 24, best shown in Figs. 6 and 7, is longer than the width of the slot 22 and has its ends slotted so that the side wall 20 of the casing is received in these slots. The pin 24 cannot move in a direction perpendicular to the wall 20 because of this arrangement, although it is free to slide along the slot 22. Since the pin is fixed in the shaft 23, it thus prevents the shaft from moving longitudinally, without interfering with its transverse movement up or down the guiding slots 22. The slot 22 in which the pin 24 slides is enlarged at one end to enable the pin and shaft 23 to be properly engaged with the slot when the machine is assembled. Plates 25, best shown in Figs. 2 and 3, may be fixed to the outer sides of the walls 20, so as to cover the slots 22 and prevent dust or dirt from entering the machine therethrough. These plates have offset portions formed to provide ample clearance for the projecting ends of the shaft 23, so that they do not interfere with the movement of the shaft.

Rotatably mounted upon the shaft 23 is a plurality of printing instrumentalities such as the type segments 30. Each of these segments is of the shape best shown in Fig. 5, and includes a series of teeth 31 formed on a portion of the periphery of the segment, and an extention 32 which has a pin 33 fixed therein and extending laterally to one side thereof. Around a portion of the periphery of the type segment 30 approximately opposite the extension 32 is fixed a type block 35 having type faces 36 formed thereon. The type faces may represent digits from 0 to 9 inclusive, or the type block may carry any other characters thought to be suitable or appropriate. Each type face is preferably serrated or roughened for cooperation with the roughened platen 13, as above described.

The main body portions of the type segments 30 are preferably formed of comparatively thin sheet material, and the type blocks 35 are considerably thicker, as shown in Fig. 3, since these type blocks must be at least as thick as the width of the type characters formed on them. The type segments are placed on the shaft 23 with the adjacent sides of adjacent type blocks practically in contact, and with the body portions 30 spaced from each other, as clearly shown in Fig. 3. To hold the body portions 30 in alinement and to prevent the possibility of their wobbling or sliding longitudinally along the shaft 23, each of the segments 30 is preferably fixed to a sleeve 37 rotatably mounted on the shaft 23. Each of the sleeves is of a length approximately equal to or very slightly greater than the thickness of the type blocks 35. The end of the sleeve 37 on each type segment may therefore bear against the end of the sleeve on the next type segment, and when adjacent segments are positioned in this manner the type blocks will be approximately in contact with each other, as shown in Fig. 3. Thus each type segment is independently rotatable upon the shaft 23 and is held in proper relationship to the other segments by means of the sleeve construction above described.

Preferably two of the type segments at the right hand end of the group of segments are separated slightly from the others, to differentiate between the numerals printed for dollars and those for cents. This separation may be accomplished by a collar 40 (see Fig. 3) fixed to the shaft 23 by a pin 41. If desired, a radial extension 42 may be formed on this collar, this extension carrying at its end a printing type comprising the word "And" or other suitable designation.

Another collar 44 may be pinned to the shaft 23 to the right of the two type segments for printing the cents, these two type segments being held in proper alinement by the collars 40 and 44 and being prevented from moving longitudinally along the shaft 23 by these collars. The collar 44 also has an extension 45 somewhat similar to the extension 42 on the collar 40. This extension 45 may have printing types formed at the end thereof, these types being adapted to print any suitable characters such as "Cts."

At the left hand end of the machine is a collar 46 also pinned to the shaft 23, and so arranged that the type segments for printing the dollars are held between the collar 46 and the collar 40 so that longitudinal movement of the type segments along the shaft is prevented. This collar 46 also carries a radial extension 47 similar to the extensions 42 and 45 on the other collars 40 and 44 respectively. The extension 47, however, is shorter than the extensions 42 and 45, and it does not carry any printing type at the end thereof.

It will now be seen that there has been provided a supporting member (the shaft 23) spaced from and substantially parallel to the platen, and that this supporting member carries a plurality of printing instrumentalities, these instrumentalities being held in position on the supporting member by the collars above described so that they are properly alined and retained against movement longitudinally of the supporting member. Furthermore, each separate printing instrumentality is independently settable to a position for printing any one of the characters formed on it, and all of the printing instrumentalities are bodily movable as a whole toward and away from the platen, this bodily movement taking place when the supporting member 23 is moved upwardly or downwardly in the slots 22. The mechanism for setting the printing instrumentalities into position to print the desired characters, and for moving them bodily to effect the actual printing, will now be described.

Figure 5:
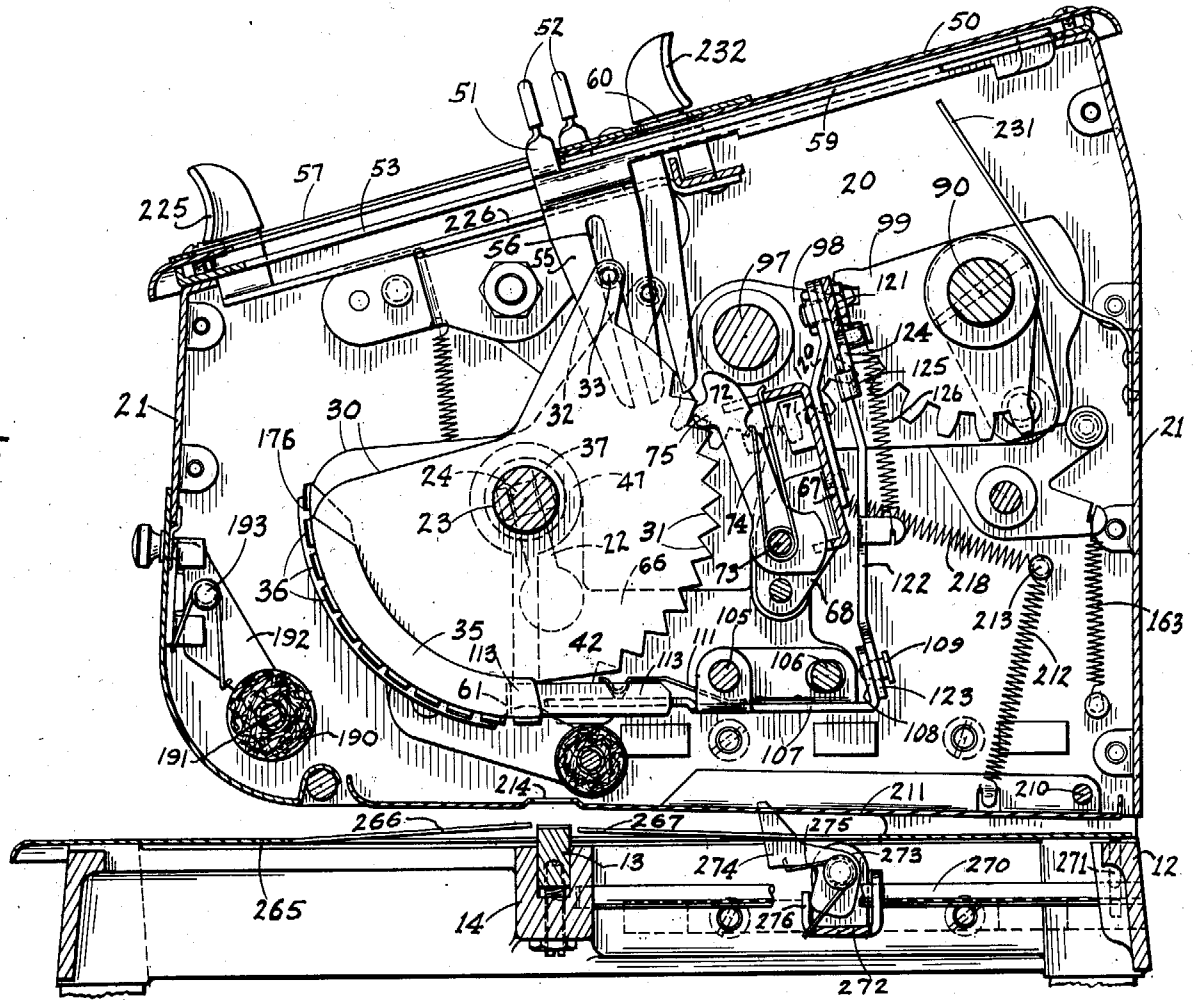
Fig. 5 is a longitudinal vertical section taken approximately on the line 5—5 of Fig. 3.

Referring now especially to Figs. 3, 5, and 6, it will be seen that the casing of the machine is provided with a cover plate 50 having a series of slots formed therein parallel to each other and longitudinally of the machine, the number of these slots being equal to the number of type segments in the machine. Setting instrumentalities, adapted to move the type segments into position for printing the desired characters, are slidably mounted in these slots. These setting instrumentalities may comprise bent sheet metal slides 51 having portions extending upwardly through the slots in the cover plate and terminating in finger pieces 52 by which each of the slides 51 may be moved to any desired position along its slot. Below the cover plate and parallel thereto is a retaining plate 53 having longitudinal slots therein parallel to the slots in the cover plate but offset therefrom, as shown in Fig. 3. Each of the setting slides 51 is bent to form a horizontal portion resting upon the retaining plate 53 and a vertical portion extending through the slot in this retaining plate, as illustrated. As may be seen from Fig. 3, the slots in the cover plate through which the upper ends of the slides project are spaced farther apart than the spacing of the type segments, this arrangement being designed to secure greater ease and convenience in manipulating the finger pieces 52. The slides therefore have offset portions 54 which terminate in downwardly extending portions 55 for cooperation with the pins 33 on the type segments 30. Each of these portions 55 has a slot 56 into which the pin 33 of the corresponding type segment extends. It will be noted from Figs. 5 and 6 that the cover plate 50 is placed at an angle and that the slots 56 are substantially perpendicular to the cover plate 50 and substantially parallel to the slots 22 in which the shaft 23 moves. It will be obvious from Fig. 5 that movement of the slides 51 along their slots will rotate the type segments 30 about the shaft 23. By moving the finger pieces 52, the type segments 30 may therefore be set to any predetermined position, so that any selected character on each type segment will be placed in proper position to cooperate subsequently with the printing platen 13.

Figure 1:
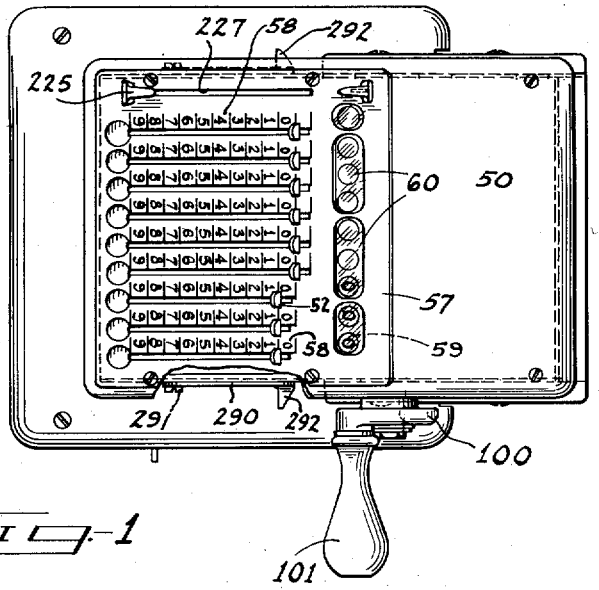
Fig. 1 is a plan of a machine constructed in accordance with a preferred embodiment of the invention.

To enable the operator to set the type segments for printing the desired matter, an indicating plate 57, best shown in Fig. 1, may be attached to the top of the cover plate 50. This plate is provided with slots overlying the slot in the cover plate, the slides 51 extending upwardly through these slots in the indicating plate. Suitable indicia 58 may be placed on the indicating plate along each of the slots, this indicia preferably comprising the digits 0 to 9 inclusive. When any finger piece 52 is moved to a position opposite a predetermined digit on the indicating plate, its corresponding type segment 30 will be rotated to such a position that the same digit on the type block 35 will be in proper position to cooperate with the printing platen 13 when the shaft 23 and the type segments are subsequently moved downwardly bodily during the printing operation.

As shown in Fig. 5, each of the slides has a rearward extension 59 on which digits may be marked. Sight openings 60 formed in the cover plate and indicating plate are arranged so that one of the digits on one of the extensions 59 may be observed through each sight opening, this digit being the one corresponding to the position in which the slide has been set. For example, if the finger piece of any one of the slides be moved to a position opposite the numeral 7 of the indicia 58, the numeral 7 will also appear through the sight opening 60 associated with the same slide.

The right hand three slides, corresponding to the units of dollars and the units and tens of cents, have slots shorter than those of the rest of the slides, as shown in Fig. 1. These three slides and their associated type segments 30 are always in position for printing one of the digits from 0 to 9 inclusive, and the 0 will always be printed if no other number is set up on these three slides. The other slides, from the tens of dollars up to the highest denomination included in the machine, have their slots extended so that the finger pieces 52 may be moved past the 0 position to what may be termed a non-print position. When the slides are in this position, the corresponding type segments 30 are placed so that the printing blocks 35 are entirely out of the printing line and no digit or other character will be printed. In Fig. 5, one type segment is shown in 0 position and another type segment behind and partially hidden from view by the first segment is shown in non-print position. The end of the type block when in this non-print position is indicated by the numeral 61.

Means may be provided for holding the type segments 30 in the position in which they have been set to prevent accidental displacement thereof, and also for alining the segments accurately so that the characters printed by them will be properly alined transversely of the printing line. Such means preferably comprises spring detents arranged to cooperate with the teeth 31 formed on each type segment. The downward extension 45 on the collar 44 may have a rearward flange or extension 65 fixed thereto, while the downward extension 47 on the collar 46 has a rearward extension or flange 66. A comb plate 67 has ears 68 through which a rod 69 passes, this rod being inserted through a hole in the flange 65 and screwed into a tapped opening in the flange 66. The ears 68 lie against the inner surfaces of the flanges 65 and 66, and prevent longitudinal movement of the comb plate along its supporting rod 69. Ears near the upper edge of the comb plate may be secured by screws 70 to upward extensions 71 on the flanges 65 and 66.

A series of dogs or spring detents 72 is pivotally mounted on a rod 73 having its ends fixed in the ears 68 of the comb plate. A spring 74 is associated with each of the detents 72 and tends to move each detent counter-clockwise when viewed as in Fig. 5 so as to bring the nose 75 of the detent into cooperation with the notches between the teeth 31 on type segments 30. Forwardly extending flanges at the top and bottom of the comb plate are provided with slots for guiding the detents 72 and preventing sidewise displacement thereof, while permitting the detents to oscillate about their pivot shaft 73 so as to ride over the teeth 31 when the type segments 30 are turned.

It will be understood that the comb plate 67 and the detents 72, being mounted on the flanges 65 and 66 which are rigid with the shaft 23, move downwardly as a unit with this shaft when the shaft and type segments are depressed to effect printing. The nose 75 of each detent, being engaged with the teeth 31 of its associated gear segment 30 will keep the gear segment in the position to which it has been adjusted while the segment moves down into printing relationship with the platen 13 and while it returns from this position. Moreover, the detents will aline the printing types accurately, since the teeth 31 are so formed that the nose 75 of the detent will be seated in the notch between two adjacent teeth when one of the printing types on the block 35 is properly positioned to print accurately on the printing line. Thus, if a finger piece 52 is set to such a position that the desired character on its type segment is slightly out of proper alinement, the action of the spring 74 tending to move the detent 72 counter-clockwise will cause the nose 75 of the detent to move the segment 30 through a fraction of a revolution to aline the printing type correctly.

It will be understood, as above mentioned, that the cooperating faces of the printing types and of the platen are roughened or serrated so that a sheet of paper placed between the platen and the types will be embossed or shredded. In order to accomplish the embossing or shredding satisfactorily, it is necessary to use considerable force in pressing the types against the platen, and it is one of the objects of this invention to provide simple and effective mechanism for applying such force easily and conveniently. The means for moving the type segments into cooperation with the platen will now be described, referring particularly to Figs. 3, 4 and 6.

A U-shaped bracket 80 is attached to the inner face of each of the side walls 20 at a point approximately above the shaft 23. A stud 81, having one end supported by the side wall 20 and the other by the central portion of the U-shaped bracket 80, extends through holes in a pair of links 82 which form one member of a toggle. A stud 83 connects the two links 82 of each pair to each other, these links being spaced from each other as shown in Fig. 3. Another stud 84 is fixed through the links 82 near the end opposite to that through which the pivot 81 passes, and on this stud 84 is pivotally mounted a link 85 forming the other member of the toggle, this link 85 having its other end rotatably mounted on the type segment shaft 23. In order to operate the toggle, a link 86 also has one end pivotally mounted on the stud 84, the other end of this operating member having a slot 87 embracing a pin 88 fixed to a crank arm 89 secured by means such as the pin 91 to a shaft 90.

The operating link 86 and the member 85 of the toggle are placed on the stud 84 between the two spaced members 82 forming the other member of the toggle. The two members 82, being rigidly connected to each other by the studs 83 and 84, act as a unit. The toggle is shown in its normal position in Fig. 4, in which the type segment shaft 23 is elevated to its upper or normal position, so that the type segments are out of contact with the platen.

In Fig. 6, the toggle is shown straightened out to effect a printing operation. It is obvious from an inspection of the drawings that if shaft 90 be moved in a clockwise direction, the pin 88, after sliding along the slot 87 and coming into contact with the left hand end thereof, will move the link 86 leftwardly. Since this link 86 is connected to the fulcrum 84 of the toggle, this fulcrum will be moved leftwardly with the result that the toggle will be more or less straightened or brought to the position shown in Fig. 6. Toward the end of its stroke, as the printing types are about to come into contact with the platen 13, the fulcrum 84 will be nearly in alinement with the shaft 23 and pivot 81. As will be readily understood by those familiar with the principle of the toggle, the power applied to the toggle by the link 86 will be enormously multiplied so that a comparatively slight force exerted by the operating link will result in great downward pressure upon the shaft 23. This will force the selected printing types firmly against the sheet of paper 95 which has been placed over the platen, and will result in satisfactory shredding or embossing of the paper.

It will be understood that the toggle arrangement above described is duplicated at each side of the machine, each of the toggles having its own associated operating link 86 and crank arm 89. Since both of the crank arms are fixed to the same shaft 90, which extends across the machine and is suitably supported at its ends in the side walls thereof, it follows that rotation of the shaft 90 will move the two ends of the shaft 23 downwardly uniformly. Thus the shaft 23 remains parallel to the platen during its movement and all of the printing types will be forced against the platen with equal pressure, so that all parts of the line to be printed will be impressed equally well upon the paper.

For turning the shaft 90 to operate the toggle mechanism, there may be provided a shaft 97 journalled in the side walls of the machine and having fixed thereto, as shown in Fig. 5, a gear sector 98 meshing with another gear sector 99 fixed to the shaft 90. The radius of the gear sector 98 is preferably somewhat less than that of the sector 99, so that the power transmitted from the shaft 97 to the shaft 90 will be somewhat multiplied. One end of the shaft 97, at the right hand side of the machine, extends outside of the casing and has a crank arm 100 suitably secured thereto, this arm having a handle 101 at the end thereof.

This machine is provided with a so-called prefix character adapted to print any suitable letters or symbols, such as "Exactly $". This prefix character is movable automatically to a position in which it abuts against the highest denomination type segment which has been moved from its non-print position to a position in which it will print any of the digits from 0 to 9. Thus no blank space is left on the check between the dollar mark and the number printed to represent the amount to be paid. Also, the prefix character is so constructed that it may be removed from the machine easily and rapidly and replaced by another prefix character bearing other wording if desired.

Figure 9:
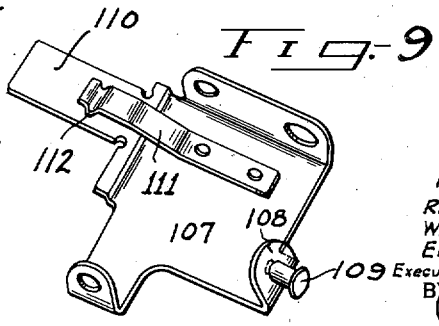
Fig. 9 is a perspective view of a slide for carrying the prefix character, showing the means for retaining the character in place on the slide.

Rods 105 and 106, best shown in Figs. 5, 6, and 7, extend across the machine and have their ends suitably secured in the flanges or extensions 65 and 66 above described. A member 107, shown in perspective in Fig. 9, is slidably mounted on these rods 105 and 106, this slidable member having ears bent up at each end thereof and provided with holes through which the rods 105 and 106 pass. An ear 108 at the back of the slide has a pin 109 fixed therein, this pin cooperating with an operating arm to be described below. At the front of the slide 107 is a forwardly extending tongue 110, and a flat spring 111 is fixed to the body of the slide so that its nose 112 overlies the tongue 110, as clearly shown in Fig. 9.

Figure 8:
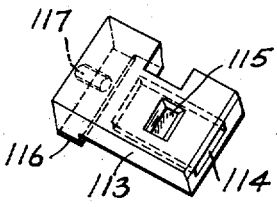
Fig. 8 is a perspective view of a prefix character.

The prefix character is shown in perspective in Fig. 8, and comprises a block 113 having a slot 114 therein of proper dimension to receive the tongue 110, and an opening 115 in the top of the block. When the prefix block 113 is placed on the tongue 110 and slid rearwardly thereon, the nose 112 of the retaining spring 111 will ride over the top of the prefix block until the rearward movement thereof is completed, when the nose of the spring will seat itself in the opening 115 and thus retain the prefix block in position on the slide 107.

On the under surface of the prefix character 113, at the forward edge thereof, is a downward extension 116 on which the desired type characters may be formed. A tapped opening 117 is provided at the front of the prefix character. A rod having screw threads at the end thereof may be screwed into this opening 117 and the rod may then be pulled forwardly to remove the prefix character from the tongue 110 and take it out of the machine. Another character adapted to print different words or symbols may then be screwed on the end of the rod and placed on the tongue 110 by an operation exactly the reverse of that which was used in removing the first prefix character. Thus it will be seen that the prefix characters are conveniently and rapidly removable and replaceable. During the operation of removing or replacing the block 113, the rod which is used for this purpose extends through an opening in the front of the casing of the machine, which will be described later in connection with the inking mechanism.

A member 120 is fixed to the comb plate 67 near the center thereof and extends upwardly therefrom. Inserted through an opening near the top of this member 120 is a bolt 121 which serves as a pivot for an arm 122 extending downwardly therefrom and having a forked end 123 embracing the pin 109 on the slide 107. Also pivoted on the bolt 121 is a short lever 124 extending rightwardly from the pivot and having a lug 125 adapted to cooperate with the side of the lever 122 to limit the motion of the lever 124 relative to the lever 122 in one direction. A spring 126, connected at one end to a stud on the lever 124 and at the other to an ear on the lever 122, tends to move the levers 124 and 122 relative to each other and keeps the ear 125 in contact with the side of the lever 122 except when the lever 124 continues to move after the motion of the lever 122 has been restrained, as will be pointed out below.

A bracket 127 is fixed to the right hand wall 20 of the casing and extends leftwardly therefrom toward the center of the machine. In this bracket 127 is formed a cam slot 128 of the shape best shown in Fig. 7, and a roller carried by a pin 129 fixed to the arm 124 cooperates with this cam slot 128.

It was pointed out above that all of the type segments 30 except the three of lowest denomination had a non-print position in addition to a plurality of printing positions for printing different characters. The rear end of the printing block 35 on a type segment which is set in its non-print position is in the position 61 shown in Fig. 5, which is just forward of the front edge of the prefix character 113. Therefore, it will be seen from Fig. 5 that the type segments which are in their non-print position do not interfere with the sidewise movement of the prefix character, but that a type segment which has been moved to any one of its printing positions is in the path of travel of the prefix character and will limit the sidewise movement thereof.

The normal position of the prefix character, when the shaft 23 is at the upper ends of its guiding slots 22, is to the left of the type segment of highest denomination, as is clearly indicated in Fig. 3. When the operating handle 101 is shifted to move the shaft 23 downwardly to effect printing, the prefix character 113 is automatically moved rightwardly until it comes into contact with the highest denomination type segment which has been placed in a printing position. This movement is accomplished by means of the levers 122 and 124 and the cam slot 128 above described.

It will be remembered that the comb plate 67 is in fixed relationship to the shaft 23 and moves up and down with this shaft. Since the member 120 is fixed to the comb plate, it follows that the pivot 121 also moves up and down with the shaft 23 and therefore the levers 122 and 124, which are pivoted at 121, likewise move bodily with the shaft. The bracket 127, in which the cam slot 128 is formed is fixed to the casing of the machine, on the other hand, and remains stationary when the shaft 23 and the levers 122 and 124 move up or down. When the pivot 121 moves downwardly with the shaft and type segment, the roller on the pin 129, cooperating with the cam slot 128, will move the arm 124 counter-clockwise as viewed from the front of the machine or clockwise when viewed from the rear as in Fig. 7. This movement of the arm 124 will tend to rotate the arm 122 in the same direction on account of the spring 126 connecting these two arms. This will result in moving the slide 107 along its guiding rods 105 and 106 toward the right hand side of the machine, and such movement will continue until the prefix character 113 abuts against a type segment which has been moved from its non-print position to one of its printing positions.

When the prefix character comes into contact with such a type segment, further movement of the slide 107 is prevented. The arm 122 then remains stationary throughout the rest of the downward movement of the shaft 23 and associated parts, while the arm 124 is enabled to continue its full oscillation by the stretching of the spring 126. The cam slot 128 is formed of such a shape that the prefix character 113 will have completed its sidewise movement before it and the type characters 36 come into contact with the paper placed on the platen.

If the check to be printed is for an amount less than one dollar, the prefix character will move rightwardly until it abuts against the units of dollars type segment, which has no non-print position and which is always in 0 position unless it is displayed therefrom to set up some other character. This units of dollars type segment therefore defines the extreme limit of rightward movement of the prefix character, and the character can never be moved farther than this type segment. On the other hand, in any specific operation of the machine, the prefix character may come to rest at any of the type segments to the left of the units of dollars segment, as above explained. Thus the prefix character is always printed close to the digit of highest denomination in the amount line of the check, and there is no space left between the prefix character and the amount which could be filled in to raise the amount of the check.

The mechanism for inking the type faces so that they will print properly upon the check will now be described, referring especially to Figs. 3, 4 and 6.

Figure 4:
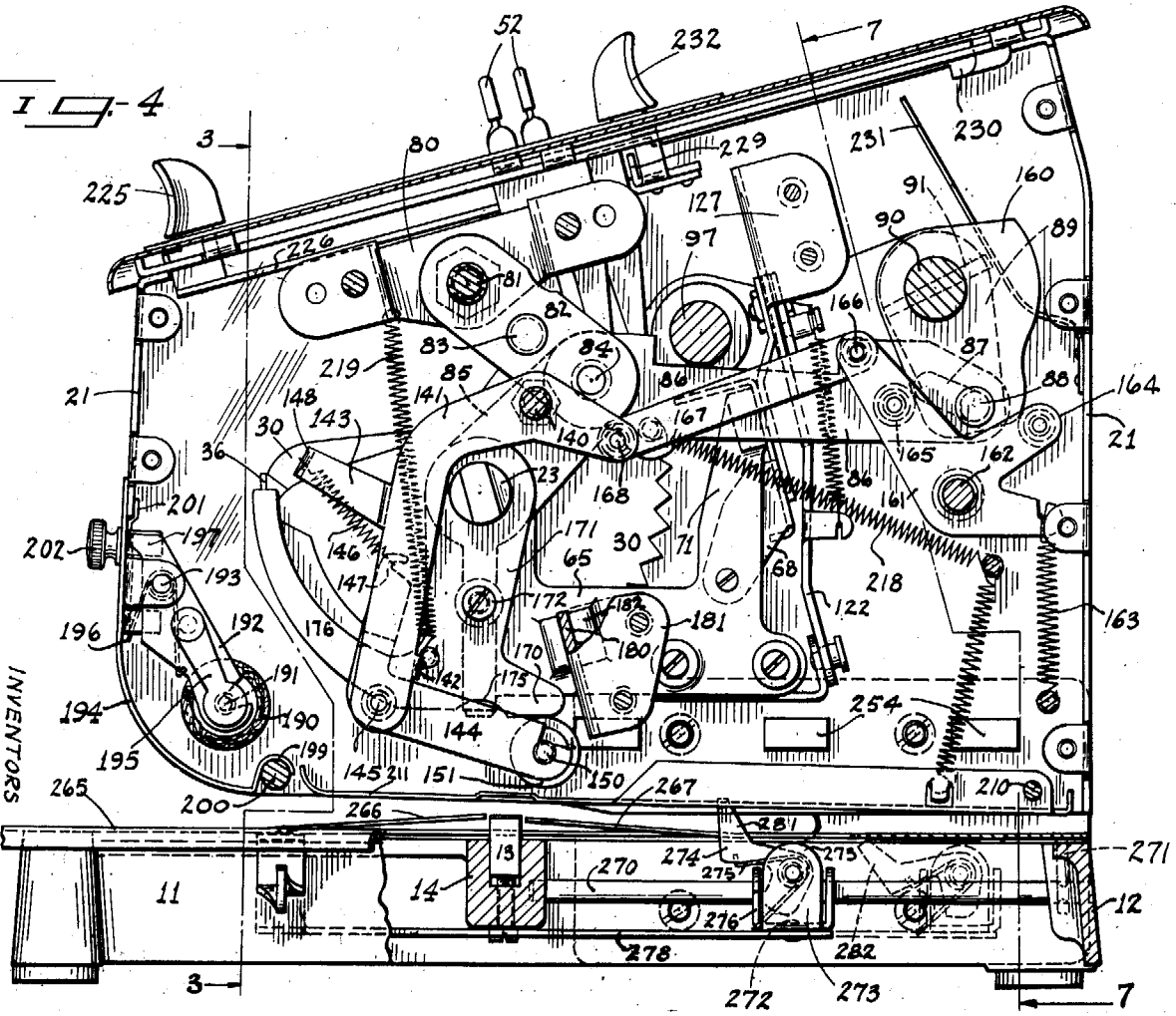
Fig. 4 is a longitudinal vertical section taken approximately on the line 4—4 of Fig. 3.

Pivoted to a stud 140 fixed to and extending inwardly from each of the side walls 20 of the machine, is a lever 141 of the shape best shown in Fig. 4. Each lever has a laterally extending ear or lug 142 formed thereon near one end, and an arm 143 extending forwardly from a point about midway between the pivot 140 and the end of the longer arm of the lever. A bell crank 144 is pivoted at 145 to the end of the longer arm of each of the levers 141. A spring 146 has one end fastened to a hook 147 on one of the arms of the bell crank lever 144 and its other end fastened to an offset ear 148 on the arm 143 which extends forwardly from the lever 141. The spring 146 thus tends to move the bell crank lever 144 in counter-clockwise direction when viewed from the right hand side of the machine as in Figs. 4 and 6. Motion in a counter-clockwise direction is limited, however, by contact of the bell crank lever with the lug 142.

A rod 150 extending across the machine has its ends supported by suitable notches in the two bell cranks 144, one at each side of the machine. Rollers 151 are mounted on the shaft 150 just inside the bell crank 144, and on a sleeve 152 surrounding the shaft 150 between the rollers 151 there is mounted a plurality of inking rolls constructed of any suitable material, such as felt. In the construction illustrated in Fig. 3, three inking rolls are shown, a black inking roll 153 for inking the prefix character 113, a red inking roll 154 for inking the amount of the check including the types formed on the block 42, and another black inking roll 155 for inking the characters formed on the type block 45, these inking rolls being separated from each other by washers 156.

The inking rolls are preferably operated from the shaft 90, which may be provided, for this purpose, with a pair of cams 160, one at each side of the machine adjacent each crank arm 89. To prevent the cam 160 from rotating relatively to the shaft 90, the pin 88 which serves to connect the crank arm 89 to the link may be extended to pass through the cam 160 also. As the crank 89 is pinned to the shaft 90 and cannot rotate thereon, and as the cam 160 embraces the shaft 90 and is pinned to the crank arm at 88, it follows that the cam is fixed to the shaft and cannot rotate thereon.

A three-arm lever 161 is pivoted at 162 to each side wall of the machine. A spring 163 having one end attached to a stud on the machine casing and the other end attached to one of the arms of the three-arm lever 161, tends to move this lever in a clockwise direction. A stud on a second arm of the lever carries a roller 164, while another stud on the third arm of the lever carries a roller 165. These two rollers are in the plane of the cam 160 and are adapted to cooperate with this cam, as will be described below.

The arm of the three-arm lever 161 which carries the roller 165 is extended a short distance past this roller, and has pivoted thereto at 166 one end of a link 167 whose other end is pivoted at 168 to the rearwardly extending arm of the lever 141.

The normal position of the parts is illustrated in Fig. 4. It will be seen that the shaft 150 on which the inking rolls are mounted is normally slightly to the rear of the printing line, and that the inking rolls are kept radially away from the types by contact of the rollers 151 with the heel extensions 170 on plates 171 at each side of the machine, these plates embracing the shaft 23 and being secured in fixed position by screws 172 passing through the plates into the downward extensions 45 and 47 of the collars 44 and 46 respectively.

As the operating handle 101 is pulled forwardly to rotate the shaft 91 in clockwise direction, the forward side of each cam 160 will push against the rollers 165 on the three-arm levers 161 and will thus rotate these levers in counter-clockwise direction. This will move the levers 141 in clockwise direction, on account of the links 167 connecting the levers 141 with the levers 161. As the levers 141 move clockwise, the shaft 150 supporting the inking rolls will be moved forwardly. As the inking rolls pass the types which have been brought to the printing line, a cut-out portion 175 in each of the plates 171 allows the springs 146 to turn the bell cranks 144 counter-clockwise a slight amount, thus bringing the inking rolls into contact with the selected types which have been set to the printing line.

The continued movement of the shaft 90 will move the levers 141 still further in a clockwise direction, so that the rollers 151 will pass out of the cut-out portions 175 in the plates 171 and will ride along the bottom edges of these plates and thence along forward arcuate extensions 176 on the plates. When the rollers leave the cut-out portions 175, the bell crank levers 144 are turned clockwise a slight amount, thus stretching the springs 146, and the inking rolls are held out of contact with the type character on the type segments 30. Thus only the characters which have been set to the printing line are inked, the inking rolls being held out of contact with all of the other type characters by reason of the engagement of the rollers 151 with the various portions of the plates 171.

While the shaft 90 turns to bring about this movement of the inking mechanism, the pin 88 on the crank arm 89 rides idly in the slot 87, without affecting the position of the toggle mechanism or moving the shaft 23. When the inking rolls have passed across the printing line and have moved part way up the arcuate extension 176, however, the pin 88 comes into contact with the end of the slot 87, and further movement of the shaft 90 results in shoving the link 86 forwardly to operate the toggle mechanism. The shaft 23 and all of the parts carried thereby, including the printing types, are thus moved downwardly to effect a printing operation upon the check 95 or other piece of paper which has been placed on the platen.

During this downward movement the parts are guided accurately and kept from movement transversely of the printing line not only by the engagement of the flattened sides of the shaft 23 with the edges of the guiding slots 22, but also by the guiding action of a flange 180 extending inwardly from a bracket 181 secured to the right hand side wall 20 of the machine, this flange 180 being embraced by a slotted lug 182 formed on the rearward extension 65 of the collar 44. This provides a guiding surface at a substantial distance from the shaft 23, and aids greatly in securing smooth and accurate movement of the parts. In addition to this, one of the screws 172 which secure the plates 171 to the members 45 and 47 may have an enlarged head adapted to bear against and slide along the side wall 20 of the casing during the upward and downward movement of the shaft 23. This enlarged head is preferably on the left hand one of the two screws 172, as shown in Figs. 3 and 7. Thus the parts 180, 182 form supplementary guiding means at the right hand side of the machine, while the screw head 172 forms supplementary guiding means at the left hand side of the machine.

Before the shaft 23 reaches the limit of its downward movement, the cam 160 completes its action on the roller 165 and the levers 141 come to rest in the position in Fig. 6. During the remainder of the downward movement of the shaft 23, the rollers 151 will continue to ride over the arcuate members 176 in exactly the same manner they did during the earlier part of the cycle.

Toward the latter part of the movement of the levers 141, the inking rolls on the shaft 150 are brought into contact with ink supply rolls 190 mounted on a shaft 191 having its ends supported in notches in arms 192 pivoted at 193 to ears fixed to a removable plate 194 forming part of the front wall of the casing. Clips 195 serve to hold the ends of the shaft 191 removably in place in the notches of the arms 192. A spring 196 tends to move each of the arms 192 in counter-clockwise direction, such movement being limited by contact of a nose 197 on the upper end of the arm with the plate 194. The ink supply rolls 190 correspond in number and spacing, of course, to the inking rolls on the shaft 150. Thus there is a red ink supply roll for cooperation with the red inking roll 154, and two black ink supply rolls for cooperation with the black inking rolls 153 and 155. During the movement of the inking rolls, they come into contact with the supply rolls and receive a fresh supply of ink. When the inking rolls are moved into contact with the ink supply rolls 190, they move these rolls slightly forwardly, compressing the springs 196 and turning the arms 192 clockwise. As the inking rolls move back away from the supply rolls, the spring 196 returns the supply rolls to their normal position shown in Figs. 4 and 5.

The plate 194 forming a part of the casing of the machine extends the full width of the machine and has a curved portion 199 at its bottom edge which fits over a rod 200 extending across the machine and secured at its ends to the side walls thereof. A latch 201 operated by a thumb screw 202 holds the upper edge of the plate 194 in place. The plate can be removed instantly from the machine simply by turning the thumb screw 202 through a quarter of a turn and lifting the plate out. Since the plate carries the ink supply rolls 190 with it, these rolls may be given a fresh supply of ink conveniently. The removal of the casing 194 also forms a suitable opening through which may be inserted a rod adapted to be screwed into the tapped opening 117 on the prefix character 113, in order to remove this character in the manner described above.

Pivotally mounted on a rod 210 extending across the machine near the rear thereof, is a guard plate 211 urged upwardly by a spring 212 having one end fixed to the guard plate and the other to a stud 213 on the casing. The guard plate 212 has an opening 214 at the printing line, as shown in Fig. 5, and the types which have been set to the printing line are adapted to project a slight distance through this opening 214 to cooperate with the platen 13. The other types on each type segment, which are not in alinement with the opening 214, cannot smear the check nor make accidental markings thereon, when a guard plate such as this is used.

In Fig. 6 the parts are shown in position to effect printing on a check or other piece of paper. The shaft 23 is in its lowermost position, so that the types which have been brought to the printing line are pressed tightly against the paper overlying the platen 13. It will be noted that the downward movement of the type segments depresses the guard plate 211 slightly, moving it from its normal position illustrated in Figs. 4 and 5 to the position shown in Fig. 6. In this fully operated position, it will be seen that the links 86 come into contact with the shaft 97 at one or both of the points 215 and 216, this contact serving to limit the motion of the links 86 and to prevent breakage of the machine which might result from excessive force applied to the handle 101.

When the desired printing operation has been effected, the operating handle is moved upwardly and rearwardly to its normal position. This turns the shaft 90 counter-clockwise, so that a portion of each of the cams 160 presses against the rollers 164 on the three-arm levers 161, thus moving the levers 161 clockwise to return the inking mechanism to normal position as the shaft 23 and the type segments move upwardly. The return of the inking mechanism is assisted by the springs 163. The upward movement of the shaft 23 and the parts supported thereby is assisted by the springs 218 which pull rearwardly on the links 86, and also by the springs 219 which pull upwardly on the plates 171, as shown in Fig. 4. These various springs are preferably made of a strength slightly more than sufficient to overcome the force of gravity acting on the movable parts, so that if the operating handle 101 be released when printing has been effected it will fly back automatically to normal position due to the action of these springs. The return motion of the parts is limited by the engagement of the upper edge of a cut-out portion of the links 86 with the shaft 97, as illustrated in Fig. 4.

After each operation of the machine, the type segments 30 remain set up in position to print the same number. Therefore, if it is desired to make out several checks for the same amount, this amount need be set up but once on the slides 52 forming the keyboard, and this amount will continue to be printed as often as the operating handle 101 is pulled forward to operate the toggle mechanism.

When it is desired to clear the keyboard or to return the type segments 30 to normal position, this may be accomplished easily and quickly by pushing rearwardly on a thumb piece 225 illustrated in Figs. 1, 2, 4, 5 and 6. This thumb piece is secured to an upwardly extending portion of a slide 226 arranged below and substantially parallel to the cover plate of the machine, and the upwardly extending portion to which the thumb piece 225 is attached extends through alined slots 227 in the cover plate 50 and indicating plate 57, and is adapted to slide back and forth therein.

The rear end of the slide 226 is attached to a cross-piece 228 which extends across the machine under the retaining plate 53 and is supported for sliding movement by having its ends bent upwardly through slots in the plate 53 and then bent over to form supporting shoulders, as illustrated clearly in Fig. 7. The slots in the retaining plate 53 through which the ends of the cross-piece 228 extend are parallel to the slots in which the slides 51 are guided, so that the cross-piece 228 may be reciprocated back and forth in the same direction in which the setting slides 51 are movable. At the forward edge of the cross-piece 228 is an upstanding flange 229, and the rear ends of the rearward extensions 59 on each of the setting slides 51 have downwardly extending lugs 230 adapted to cooperate with this flange.

The normal position of the cross-piece 228 is approximately midway between the front and the back of the machine, this being the position illustrated in Figs. 4 to 6 inclusive. When the slides 51 are in their normal positions, the downwardly extending lugs 230 are near the back of the machine as shown in Figs. 4 and 5. As the slides 51 are pulled forwardly to set the type segments for printing various digits, the lugs 230 move forwardly also, the maximum forward position of these lugs being just to the rear of the normal position of the flange 229, as illustrated in Fig. 6. Now if the thumb piece 225 be moved rearwardly, the slide 226 to which it is attached will cause the cross-piece 228 to move rearwardly also, and the upstanding flange 229 thereon will engage the lugs 230 and sweep them all rearwardly to normal position, thus clearing the keyboard and returning all of the type segments 30 to their normal position. During the rearward movement of the cross-piece 228 it comes into contact with a flat spring 231 fixed to the rear wall of the casing, and the tension of this spring aids the forward or return movement of the parts 225, 226 and 228 after the keyboard has been cleared. If desired, a finger piece 232 may be fixed to the cover plate 50 in such a position that it may be conveniently engaged by a finger when the thumb of the operator is pressed against the thumb piece 225, thus providing a support against which force may be exerted when the keyboard is being cleared.

It was mentioned above that the casing of the machine was supported from the base by brackets which would be described later. These brackets consisting preferably of U-shaped members 250, shown in Figs. 2 and 7, one bracket being placed at each side of the machine. Each of these U-shaped brackets is positioned so that its arms extend substantially horizontally, the lower arm of each bracket being fixed to the side walls 11 of the base and the upper arms being attached to the side walls 20 of the casing. Screws 251 may be provided for securing the brackets to the base and casing. To assist the screws in holding the parts in proper relationship, the side walls of the base may be provided with longitudinally extending grooves 252 in which lugs 253 formed on the lower arm of the bracket may engage. Suitable openings may be provided in the side walls 20 of the casing to receive lugs 254 formed on the upper arm of each bracket.

When a bracket of this form is used, the check or other piece of paper upon which printing is to be effected may extend partially into the space between the two arms of the U-shaped bracket, so that any desired portion of the check may be brought into cooperation with the platen 13.

Some users of check writers have their checks printed in the form of strips, and later cut the checks apart. As the checks are usually longer than the width of the check writing machine, the strip of checks is wider than the machine and cannot be passed through the space between the base and the casing of the machine, from front to back, when connecting brackets of the form above described are used.

Figure 10:
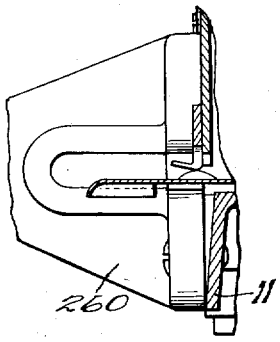
Fig. 10 is a fragmentary view similar to a portion of Fig. 3, illustrating a form of bracket for connecting the casing to the base for use with checks in sheets or strips.

When it is desired to use checks in strips, the brackets for connecting the base to the casing may be of slightly different form in order to allow passage of the strips through the machine. This form of bracket is shown at 260 in Fig. 10. It will be noted that this bracket is similar to the other form of bracket in that it also is U-shaped and has its lower arm connected to the base while its upper arm is connected to the casing in the same manner that the arms of the bracket 250 are connected to the base and casing. In this instance, however, the brackets 260 do not lie along the sides of the machine but extend outwardly substantially perpendicular to the sides. The strip of checks may extend into the space between the two arms of the U-shaped bracket, as is the case with the bracket of the other form, but as these brackets extend outwardly at right angles to the sides of the machine, the clear width of the opening between the brackets is greater than the width of the casing, and a strip of checks may be passed easily through the machine.

A paper-supporting plate 265 is fixed to the top of the base, and is provided with an opening through which the platen 13 projects, the top of the platen being slightly above the level of the plate. Preferably the plate 265 is slotted to form resilient portions 266 and 267 which have their ends adjacent to and slightly above the top of the platen 13, as illustrated in Figs. 3 and 5. These resilient portions act as stripper plates to disengage the paper from the roughened or serrated surface of the platen after the printing operation is completed. When the printing types move down into cooperation with the platen, the resilient stripper plates will be depressed to the position shown in Fig. 6, and when the types move upwardly again the resilient portions return to their normal position, lifting the check from the platen.

An adjustable paper guide may be provided, to act as a stop against which the edge of a check may be positioned, so that the amount line of the check may be brought quickly to the proper printing line of the machine. The details of the paper guide are illustrated especially in Figs. 3, 4, and 7, from which it will be seen that rods 270 have their ends supported in the cross-bar 14 and the rear wall 12 of the base, and are held in position by pins 271. A cross-piece 272 has upwardly extending flanges embracing the rods 270 and slidable thereon, and the ends of the cross-piece 272 are bent up to form ears 273 on which dogs 274 are pivotally mounted. Springs 275 tend to turn the dogs in clockwise direction when viewed as in Figs. 4 and 5, the extent of such motion being limited by contact of heels on the dogs with lugs 276 formed on the cross-piece 272. The upper ends of the dogs 274 are adapted to project through slots in the plate 265, these slots being preferably the same ones which serve to separate the sides of the resilient portion 267 from the body of the plate. Slots may also be formed in the guard plate 211 in alinement with the slots in the plate 265, so that the dogs 274 may extend through the guard plate, as shown in Figs. 4 to 7.

Fixed to the cross-piece 272 is an operating member comprising a forwardly extending portion 278 which has, at its forward end, a lateral extension 279 bent so as to pass through the free space between the top of the side wall 11 of the base and the plate 265, and terminating in a finger piece 280, as shown in Fig. 3. If the finger piece 280 be moved toward the front or rear of the machine, it is obvious that the upwardly extending dogs 274 will be moved correspondingly toward the front or rear of the machine. Thus an adjustable stop or paper guide is provided so that checks of different sizes may be printed with equal ease, the guide simply being moved to such a position that it will contact with the rear edge of the check when the amount line of the check is properly positioned relative to the platen.

When the checks to be made out are in the form of strips, however, instead of each one being separate, the paper guides 274 would interfere with the movement of the strip of checks through the machine. To enable the machine to be used with strips, the paper guides are formed so that they may be retracted to an ineffective position. For this purpose, an inclined cam surface 281 is formed on the rear edge of each of the pivoted dogs 274, and this surface is adapted to cooperate with the rear end of the slot in the plate 265 through which the dog projects, so that the dog will be cammed down to the position shown in doted lines at 282 in Fig. 4. In this position, the paper guides or dogs are completely retracted and lie wholly beneath the plate 265, so that they will not interfere in any way with movement of a sheet of paper over the surface of the plate. In order to move the guides to an effective position, it is simply necessary to pull forwardly on the finger piece 280. As the dogs pass the ends of the slots in the plate 265, the springs 275 will move the dogs clockwise so that they project through these slots. Rearward movement of the finger piece to a sufficient extent will cam the dogs down again to their ineffective position.

When checks in the form of strips are used, it is desirable to have some means for holding the checks in place on the platen, to prevent accidental movement thereof, and to aid in alining the amount line of the check properly. The guides 274 cannot be used for this purpose, as above pointed out. An arm 290, shown in Figs. 2 and 3, may be pivoted to each side of the casing at 291 and may have a lateral lug 292 near its free end, this lug being adapted to overlie a raised portion 293 formed on the plate 265. When a check is inserted between the lugs 292 and the portions 293 of the plate, the weight of the arms 290 will serve to some extent to hold the check frictionally in place. Moreover, the forward edges of the lateral lugs 292 may be so placed that they are in alinement with the printing line of the machine, and they thus form convenient guides or indicators to aid in placing the amount line of the check in proper position to be printed upon. Successive checks on the strip are placed with their amount lines in registry with the edges of the lugs 292, and each check, when brought to this position, is ready to be printed.

It will now be seen that a generally improved machine has been disclosed, having many improvements over the check writers heretofore commonly used. The mechanism is exceedingly simple in operation, is not likely to get out of order, and may be easily repaired when necessary.

While certain embodiments of the invention have been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

We claim as our invention:

1. In a check writer, the combination of a platen, a plurality of type segments, a shaft on which said segments are mounted, side plates having slots forming guiding means, the ends of said shaft extending into said slots and being guided therein for bodily movement toward and away from said platen, and operating means including a toggle for moving said shaft to shift said type segments toward and away from said platen.

2. In a check writer, the combination with a platen, of printing instrumentalities movable relative thereto, toggle means for moving said printing instrumentalities, inking devices for inking said printing instrumentalities, cam means for moving said inking means into and out of cooperative relationship with said printing instrumentalities, and means including a lost motion connection for operating said toggle means after said cam means has moved said inking means to predetermined position.

3. In a check writer, the combination with a platen, of a shaft substantially parallel to and spaced from said platen, guiding means in which said shaft is movable toward and away from said platen, a plurality of type segments mounted on said shaft, a toggle link connected to said shaft and arranged to move said shaft toward said platen as said toggle link is straightened, an operating shaft having a crank arm thereon, and a link connecting said crank arm to said toggle link for operating the latter from the former to move said type segments into cooperative relationship with said platen.

4. In a check writer, the combination with a platen, of a paper guide movable toward and away from the printing line of said platen, and cam means operated by movement of said paper guide to withdraw said guide from cooperative relationship with a sheet of paper.

5. In a check writer, the combination with a paper supporting member having a slot therein, of a member slidably mounted beneath said paper supporting member, a paper guide mounted on said slidable member, resilient means tending to project a portion of said paper guide through said slot, and a cam surface formed on said paper guide and adapted to cooperate with one end of said slot when said supporting member is moved to predetermined position to depress said paper guide to an ineffective position.

6. In a check writer, the combination with a paper supporting member having a slot therein, of a guide member below said paper supporting member and substantially parallel to said slot, a slide movable along said guide member, a paper guide pivotally mounted on said slide, resilient means tending to project a portion of said paper guide through said slot, and cam means adapted on movement of said slide to a predetermined position to withdraw said paper guide from said slot.

7. In a check writer, the combination with a platen, of a casing, printing instrumentalities bodily movable in said casing toward and away from said platen, manipulative devices for setting said printing instrumentalities in predetermined position, and connections between said manipulative devices and said printing instrumentalities including a slot parallel to the direction of bodily movement of said printing instrumentalities.

8. In a check writer, the combination with a platen, of a casing, printing instrumentalities settable to a plurality of different positions for printing different characters, said printing instrumentalities being body movable toward and away from said platen, setting-up instrumentalities for setting said printing instrumentalities in predetermined position, a slot in one of said instrumentalities, and a member on the other of said instrumentalities cooperating with said slot to transmit movement of said setting-up instrumentalities in one direction to said printing instrumentalities and to allow bodily movement of said printing instrumentalities toward and away from said platen without corresponding movement of said setting-up instrumentalities.

9. In a check writer, the combination with a casing, of printing instrumentalities settable to a plurality of different positions for printing different characters and bodily movable relative to said casing to a printing position, and setting instrumentalities slidably mounted on said casing for setting said printing instrumentalities in predetermined position, said printing instrumentalities being connected to said setting instrumentalities and remaining in the same position originally set thereby throughout said bodily movement of said printing instrumentalities, said setting instrumentalities remaining fixed relative to said casing during said bodily movement of the printing instrumentalities.

10. In a check writer, the combination with a casing, of a supporting shaft bodily movable therein, slots in said casing for guiding said supporting shaft during its movement, a plurality of type segments mounted upon said supporting shaft, each of said segments being settable to a plurality of different positions for printing different characters, a pin on each of said type segments, a plurality of slides mounted on said casing for setting said type segments to predetermined position, each of said sides including a slot cooperating with the pin on the corresponding type segment, said slots on said slides being parallel to said slots in said casing, so that said setting slides may remain stationary when said supporting shaft and said type segments move bodily relative thereto into printing position, said type segments remaining operatively connected with said setting slides during such movement.

11. In a check writer, the combination with a prefix character movable to a plurality of different printing positions, of a movable supporting member on which said prefix character is mounted, and resilient means removably retaining said prefix character in predetermined position on said supporting member, said prefix character having a portion arranged to interlock and cooperate with a handle member so that when said handle member is attached to said prefix character a simple pull on said handle will release said prefix character from said resilient retaining means.

12. In a check writer, the combination with a plurality of type segments, each having a non-printing position and a plurality of different printing positions for printing different characters, of a slide, a prefix character removably mounted on said slide, and means tending to shift said slide so as to move said prefix character into contact with the type segment of highest denomination which has been moved from its non-printing position to any one of its plurality of printing positions, the direction of relative movement between said slide and prefix character when the latter is removed or replaced being at an angle to the direction of shifting of said slide.

13. In a check writer, the combination with a slide having a tongue thereon, of a prefix character having a slot in which said tongue is adapted to be seated, detent means for retaining said prefix character in predetermined position on said tongue, and means tending to move said slide to shift said prefix character toward a predetermined printing position.

14. In a check writer, the combination with a slide having a tongue thereon, of a prefix character having a slot in which said tongue is adapted to be seated, detent means for retaining said prefix character in predetermined position on said tongue, and cam controlled means for shifting said prefix character to one of a plurality of printing positions.

15. In a check writer, the combination with a casing, of a platen, a frame, printing instrumentalities mounted on said frame and movable bodily therewith toward and away from said platen, each of said printing instrumentalities having a non-printing position and a plurality of printing positions, a prefix character, and means including a cam fixed relative to said casing and a cam follower mounted on said frame and cooperating with said cam during movement of said frame and said printing instrumentalities toward said platen for moving said prefix character into contact with the printing instrumentality of highest denomination which has been moved from its non-printing position to a printing position.

16. In a check writer, the combination with a member carrying a printing platen, of a second member including printing instrumentalities for cooperation with said platen, means for connecting said first and second members, said connecting means including a U-shaped bracket so arranged that a sheet of paper to be printed upon may extend into the space between the two branches of said U-shaped bracket, and interlocking means on said bracket and said first and second members so that said members may be accurately positioned in predetermined relations to said bracket and to each other when assembling the parts.

17. In a check writer, the combination with a base carrying a platen, of a casing carrying printing instrumentalities for cooperation with said platen, a plurality of U-shaped members connecting said casing to said base, said U-shaped members being so arranged that a sheet of paper placed between said platen and said printing instrumentalities may extend partially into the space between the two branches of each U-shaped member, and interlocking means on said bracket and said first and second members so that said members may be accurately positioned in predetermined relationship to said bracket and to each other when assembling the parts.

18. In a check writer, the combination with a plurality of printing instrumentalities, of a plurality of setting instrumentalities for setting said printing instrumentalities in predetermined position, each of said setting instrumentalities comprising a slide having a finger piece thereon and being independently displaceable from a normal position to set its associated printing instrumentality, and resetting means comprising a member extending across the paths of travel of said setting instrumentalities and movable to contact with all of said setting instrumentalities which have been displaced to return all of the displaced setting instrumentalities concomitantly to normal position.

19. In a check writer, the combination with a platen having a printing line, of a member movable toward and away from said printing line, and a plurality of paper guides mounted on said movable member, said paper guides being arranged on a line substantially parallel to said printing line for cooperation with one edge of a sheet of paper positioned to overlie the printing line of said platen.

20. In a check writer, the combination with a platen, of a supporting member movable relative thereto, a plurality of paper guides mounted on said supporting member for movement therewith relative to said platen as a unit, and means for moving said supporting member to a position in which said guides are ineffective to cooperate with a sheet of paper.

21. In a check writer, the combination with a platen, of a plurality of paper guides movable relative to said platen and adapted to cooperate with a sheet of paper positioned on said platen, and means for moving all of said paper guides concomitantly to any one of a plurality of different positions for guiding individual checks of different dimensions or to a position in which they are ineffective to cooperate with said sheet of paper for use with sheets of checks.

22. In a check writer, the combination with a base unit, of a casing unit spaced therefrom to provide an opening between said base unit and said casing unit adapted to receive a piece of paper to be printed upon, and means including a pair of splice plates, one at each side of said base unit and casing unit and each connected to both said base unit and said casing unit for holding said two units in fixed relationship to each other.

23. In a check writer, the combination with a plate having a series of slots therein, of a second plate spaced from and substantially parallel to said first plate, said second plate having a series of slots therein substantially parallel to the slots in the first plate and offset therefrom and a series of manipulative devices slidably mounted between said plates, each of said manipulative devices including an arm extending through one of the slots in one plate and a second arm extending through one of the slots in the other plate.

24. In a check writer, the combination with a plate having a series of slots therein, of a series of manipulative devices each having a part slidable in one of said slots and each having a normal position and being displaceable therefrom, and a member movable longitudinally of said slots for returning the displaced manipulative devices to normal position, said member having supporting and guiding portions extending through slots in said plate.

25. In a check writer, the combination with a plurality of devices each having a normal position and being displaceable therefrom, of means for returning the displaced devices to normal position, said means including a movable finger piece, and a fixed abutment associated with said movable finger piece against which force may be exerted when moving said finger piece.

26. In a check writer, the combination with a plate having a plurality of slots therein, of a second plate removably secured to said first plate and having a plurality of slots in alinement with the slots in the first plate, and a plurality of manipulative devices each having a portion projecting through one of the pairs of alined slots in the two plates, each of said projecting portions having a finger portion wider than the width of said slots so that said projecting portion cannot be withdrawn from said slots, the slots in one of said plates having enlarged openings at one end, and the slots in the other of said plates having enlarged openings at the other end, so that said wide finger portions may be withdrawn from said slots by passing first through the enlarged openings at one end of the slots in one plate and then through the enlarged openings at the other end of the slots in the other plate.

27. In a check writer, the combination with a member carrying a printing platen, of a second member including printing instrumentalities for cooperation with said platen, recesses in said first and second members, and means for connecting said first and second members including a bracket having lugs to enter said recesses to hold said first and second members accurately in predetermined relationship.

28. In a check writer, the combination with a platen, of a support, a prefix character removably mounted on said support, means for moving said support in one direction to position said prefix character to print at a predetermined point relative to said platen, means for moving said support in a second direction to carry said prefix character toward the platen to effect printing, and cooperating means associated with said prefix character and said support for holding the former removably on the latter, said last named means permitting removal of the prefix character from the support by movement in a direction different from said first two directions of movement of the support.

29. In a check writer, the combination with a platen, of a support, a prefix character removably mounted on said support, means for moving said support in one direction to position said prefix character to print at a predetermined point relative to said platen, means for moving said support in a second direction substantially perpendicular to the first named direction of movement, the movement in said second direction carrying said prefix character toward the platen to effect printing, and cooperating means associated with said prefix character and said support for holding the former removably on the latter, said last named means permitting removal of said prefix character from said support by movement in a direction substantially perpendicular to both of said first two directions of movement of the support.

30. In a check writer, the combination with a shaft, of printing instrumentalities mounted on said shaft, guiding means spaced from and substantially parallel to said shaft, and a prefix character mounted on and slidable along said guiding means for movement to any one of a plurality of positions relative to said printing instrumentalities.

31. In a check writer, a casing comprising a base and a top section overhanging the base to provide a slot opening for receiving a check, a bed plate on said base as a support for the check, a type support and a platen movable relatively toward each other to impress the check between them, said bed plate having a slot to permit cooperative engagement of the type and platen, and adjustable stop gauge against which the top edge of the check engages, and swinging arms pivoted to the sides of said top section with their free ends adapted to rest on the check as weights for holding it in contact with said bed plate.

32. A check writer in accordance with claim 31 characterized by the free ends of said swinging arms comprising a sight gauge for properly positioning the check with respect to the printing members and thus determining the proper adjustment of the stop gauge.

RAYMOND E. BOHRER.
WALTER B. PAYNE.
ELLA M. TIEFEL,
*Executrix of Charles G. Tiefel, Deceased.*